United States Patent [19]

Grandhi et al.

[11] Patent Number: 5,828,963
[45] Date of Patent: Oct. 27, 1998

[54] SELECTING RADIO FREQUENCY CHANNELS FOR REUSE IN MICRO-CELLULAR RADIO COMMUNICATIONS SYSTEMS

[75] Inventors: Sudheer A. Grandhi, Dallas; Seshagiri R. Madhavapeddy, Richardson; Kalyan Basu, Plano; Steven J. Willhoff, Richardson; Hong D. Staley, Dallas, all of Tex.

[73] Assignee: Northern Telecom Limited, Montreal, Canada

[21] Appl. No.: 409,802

[22] Filed: Mar. 24, 1995

[51] Int. Cl.$^6$ .................................................. H04Q 7/36
[52] U.S. Cl. ........................ 455/450; 455/447; 455/449; 455/451
[58] Field of Search .................................. 455/33.1, 33.2, 455/33.4, 34.1, 34.2, 54.1, 56.1, 62, 63, 67.1, 422, 447, 448, 449, 450, 451, 452, 453, 454, 524; 379/58, 59

[56] References Cited

U.S. PATENT DOCUMENTS

| | | | |
|---|---|---|---|
| 5,093,928 | 3/1992 | Kage | 455/34.1 |
| 5,148,548 | 9/1992 | Meche et al. | 455/34.1 |
| 5,157,709 | 10/1992 | Ohteru | 379/58 |
| 5,363,428 | 11/1994 | Nagashima | 379/58 |
| 5,448,750 | 9/1995 | Eriksson et al. | 455/33.1 |
| 5,475,868 | 12/1995 | Duque-Anton et al. | 455/62 |
| 5,504,803 | 4/1996 | Yamada et al. | 379/59 |

FOREIGN PATENT DOCUMENTS 2 260 879    4/1993    United Kingdom .

OTHER PUBLICATIONS

H. Furukawa et al., "A Microcell Overlaid with Umbrella Cell System", *Creating Tomorrow's Mobile Systems—1994 IEEE 44th Vehicular Technology Conference* 3: 1455–1459 (1994).

S. Barber et al., "Dual–Mode System Provides Smooth Evolution Path" Telesis, No. 94, Jul. 1992, pp. 35 to 51.

*Primary Examiner*—Nguyen Vo
*Assistant Examiner*—Lee Nguyen
*Attorney, Agent, or Firm*—Foley & Lardner

[57] ABSTRACT

A micro-cellular radio communications system (microsystem) is arranged to re-use radio frequency channels which are assigned for use in a cellular radio system (macrosystem) in the same vicinity. The microsystem maintains a list of each frequency channel which is in current use in any microcell of the microsystem. In each microcell of the microsystem a signal characteristic, for example received signal strength, of each frequency channel, is repeatedly measured when the channel is not in current use in any microcell of the microsystem, and the measurements are used to determine a long-term statistical preference for re-use of a favoured set of the frequency channels in that microcell. For each microcell, the frequency channels in the favoured set are given a short-term order for actual use in dependence upon frequent measurements of the signal characteristic for the microcell regardless of whether or not the channel is in current use in any other microcell of the microsystem.

19 Claims, 5 Drawing Sheets

SELECTING RADIO FREQUENCY CHANNELS FOR REUSE IN MICRO-CELLULAR RADIO COMMUNICATIONS SYSTEMS

This invention relates to micro-cellular radio communications systems, and is particularly concerned with a method of selecting radio frequency channels for use in microcells of a micro-cellular radio communications system (referred to herein as a microsystem) which is at least partly within the signal coverage area of a conventional cellular radio communications system (referred to herein as a macrosystem) to which these radio frequency channels are allocated.

BACKGROUND OF THE INVENTION

It is well known to provide a cellular radio communications system (macrosystem) for providing wireless communications between fixed and/or mobile communications terminals (e.g. telephone transceivers) and fixed radio transmitter and receiver units or transceivers which operate at allocated transmit and receive radio frequencies within a frequency spectrum allocated for the macrosystem. The transceivers are located within geographical cells which collectively form a geographical serving area within which the macrosystem operates.

Each cell of the macrosystem may for example be assigned, either statically or dynamically depending on the macrosystem, about 50 to 60 channels (more specifically, 50 to 60 pairs of related radio frequency channels, one frequency of each pair for signal transmission and the other frequency of the pair for signal reception, the frequencies of each pair typically having a fixed frequency difference of for example 40 MHz) out of a total of more than 400 channels in the allocated frequency spectrum. Adjacent cells are typically assigned different groups of channels within the frequency spectrum, the channels being reused in different, non-adjacent, cells throughout the macrosystem.

Within, or geographically overlapping with, such a macrosystem it is desirable to provide one or more (possibly a large number of) micro-cellular radio communications systems (microsystems), each of which may be independent of the macrosystem but may reuse at least some of the same radio frequency channels which are allocated to the macrosystem. For example, within a residential or commercial building it may be desirable to deploy a microsystem to provide wireless communications to occupants of the building, and these communications could be handled by a private communications system (e.g. a private branch exchange or PBX) which is completely distinct from the macrosystem and its provider. Yet it is also desirable for these occupants to be able to use the same mobile terminals both for wireless communications with the macrosystem outside (and possibly also inside) the building and for wireless communications with the microsystem within the building. In addition, it may be desired to be able to hand off communications between the macrosystem and the microsystem during movement of a mobile terminal between the outside and the inside of the building.

In order to meet these goals, and at the same time to meet the necessary requirement that operation of the microsystem not interfere with, or be interfered with by, operation of the macrosystem, it is necessary for the microsystem to determine which channels it can use at any time. In order to meet expected increasing demands for traffic capacity for both the macrosystem and the microsystems, it is also desirable that the channels identified by the microsystem as being usable be used in an efficient manner. Furthermore, it is desirable that the determination and reuse of channels by the microsystem be automatic and adaptive, for easy installation of the microsystem and operation with changing conditions over time.

An object of this invention is to provide a microsystem which facilitates meeting these desires.

SUMMARY OF THE INVENTION

According to one aspect, this invention provides a method of selecting radio frequency channels, assigned for use in cells of a cellular radio communications system (macrosystem), for use in microcells of a micro-cellular radio communications system (microsystem) in the vicinity of the macrosystem, comprising the steps of: identifying in the microsystem each frequency channel which is in current use in any microcell of the microsystem; and, for each microcell of the microsystem: measuring a signal characteristic for the microcell of each frequency channel when the channel is not identified as being in current use in any microcell of the microsystem; determining a statistical preference for use of the frequency channels in the microcell in dependence upon repeated measurements of the signal characteristic; and selecting frequency channels for use in the microcell in accordance with the statistical preference.

Preferably, for each microcell of the microsystem, the steps of determining a statistical preference and selecting frequency channels for use in the microcell comprise identifying a favoured set of frequency channels, having a most preferred signal characteristic, and using only frequency channels in the favoured set in the microcell of the microsystem.

Preferably also, for each microcell of the microsystem, the measurement of the signal characteristic for each frequency channel in the favoured set is effected more frequently than the measurement of the signal characteristic for each frequency channel which is not in the favoured set.

The method advantageously further comprises, for each microcell of the microsystem, the steps of: measuring the signal characteristic for the microcell of each frequency channel in the favoured set regardless of whether or not the channel is identified as being in current use in any microcell of the microsystem; and determining an order for use of the frequency channels in the favoured set in dependence upon recent measurements of the signal characteristic; the step of selecting frequency channels for use in the microcell comprising selecting frequency channels for use in the microcell in accordance with the determined order.

Another aspect of this invention provides a method of selecting radio frequency channels, for use in a plurality of microcells of a micro-cellular radio communications system, from a set of frequency channels, comprising the steps of, for each microcell: performing signal measurements for frequency channels in the set; determining a favoured set of frequency channels for use in the microcell in dependence upon signal measurements performed for each frequency channel when it is not in use in any microcell of the microsystem; and selecting a frequency channel for use in the microcell from the favoured set of frequency channels in dependence upon signal measurements performed regardless of whether or not the frequency channel is in current use in any microcell of the microsystem.

A further aspect of the invention provides, in a micro-cellular radio communications system (microsystem) which re-uses radio frequency channels assigned for use in cells of a cellular radio communications system (macrosystem) in the same vicinity as the microsystem, and in which a plurality of frequency channels are selected for potential use in each microcell of the microsystem, a method of assigning the selected frequency channels for use in each microcell, comprising the steps of: repeatedly measuring in the microcell a received signal strength of each selected frequency channel regardless of whether or not the channel is in current use in the microsystem; determining a preference for use of the selected frequency channels in dependence upon recent measurements of the received signal strength, frequency channels having a relatively high recent measured received signal strength not being preferred for use in the microcell; and assigning the selected frequency channels for use in the microcell in accordance with the determined preference.

BRIEF DESCRIPTION OF THE DRAWING

The invention will be further understood from the following description with reference to the accompanying drawings, in which.

DETAILED DESCRIPTION

Figure 1:
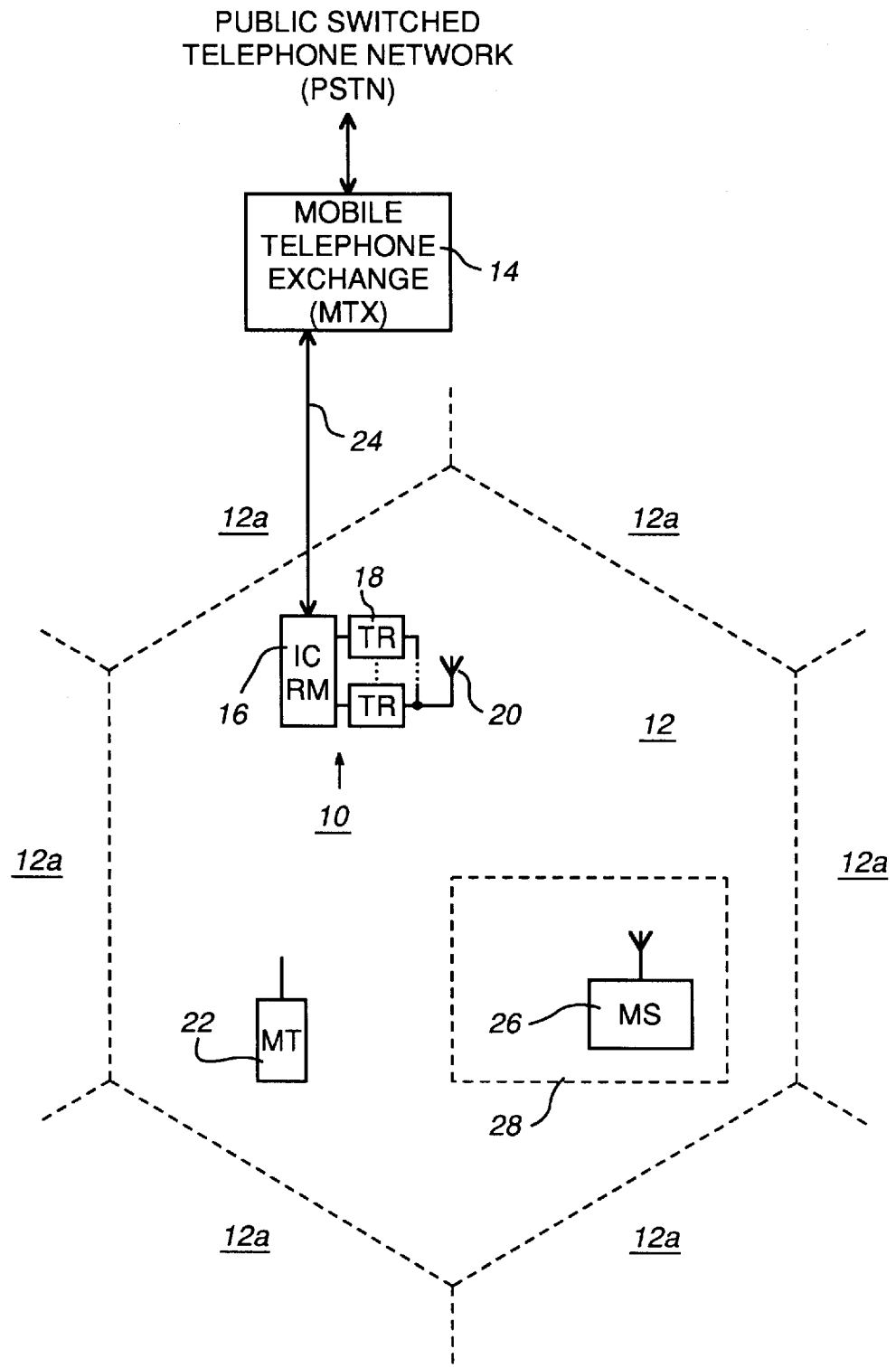
FIG. 1 schematically illustrates a known arrangement of a cellular radio communications macrosystem and microsystem.

Referring to FIG. 1, a known macrosystem comprises cell-site equipment 10 in a geographic cell 12, similar equipment (not shown) also being provided in each of a plurality of adjacent geographic cells 12a, within a geographic area served by a mobile telephone exchange (MTX) 14 which provides connections to the public switched telephone network (PSTN). The cells 12, 12a are represented schematically in FIG. 1 by broken lines indicating adjacent non-overlapping hexagonal areas of equal sizes, but the cells are more generally of differing shapes and sizes with indefinite and overlapping borders as determined by local signal conditions.

The cell-site equipment 10 in each cell 12 comprises an integrated cell-site remote module (ICRM) 16 and a plurality of radio transmit-receive units or transceivers (TRs) 18 having an antenna arrangement 20 for radio communications with mobile telephone terminals (MTs) one of which is represented at 22. Each ICRM has a wired connection 24 for multiplexed communications with the MTX 14.

FIG. 1 also schematically and generally represents a microsystem (MS) 26 which serves for providing wireless communications within a geographical area 28 which may for example be in a building within the macrosystem cell 12. The microsystem 26 is described in greater detail below. Although only one microsystem 26 is shown in FIG. 1, there may be many such microsystems in one or more of the cells 12 and 12a, each with its own geographic area 28.

As the arrangement and operation of the cell-site equipment 10 and the MTX 14 are well known in the art of cellular telephone systems, these are not further described here. By way of example, it is observed that these units are desirably of the form described in an article entitled "Dual-Mode System Provides Smooth Evolution Path" by S. Barber et al., Telesis, No. 94, July 1992, pages 35 to 51, the TRs 18 being operated in either analog or digital mode for communications with respectively analog or digital MTs 22. As also explained in that article, each TR 18 can be controlled to provide a control channel or an information channel or to operate as a locate receiver, which is used as discussed below to measure signal strengths of the radio frequency channels.

Figure 2:
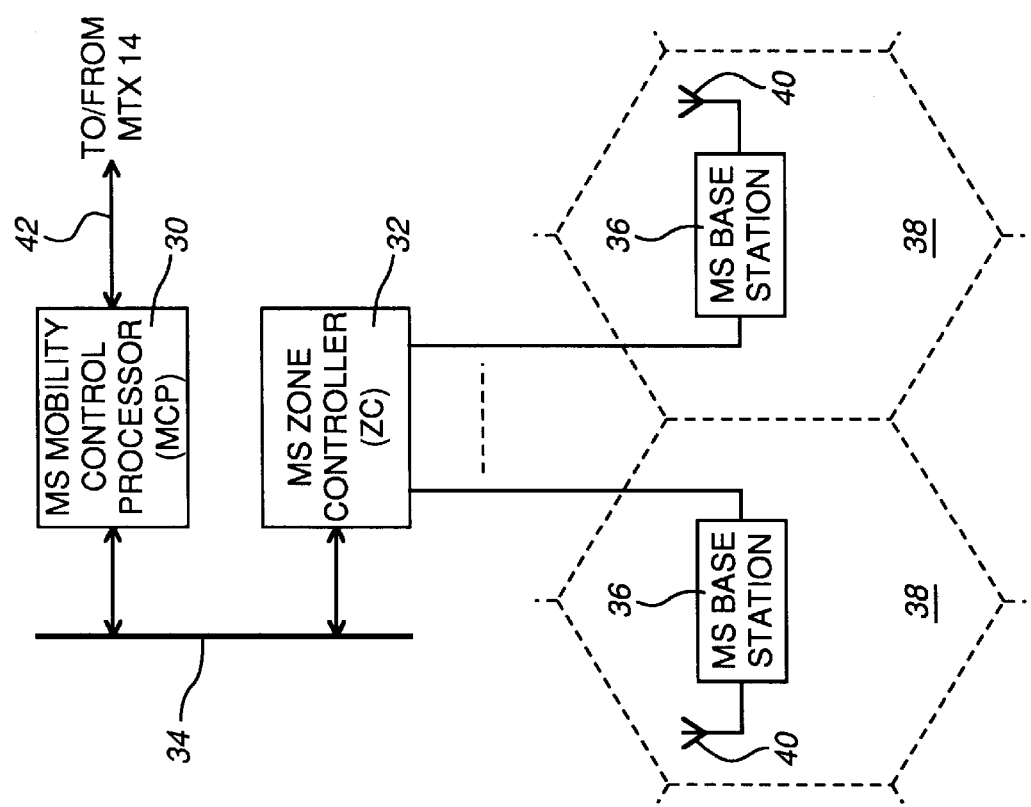
FIG. 2 schematically illustrates the microsystem in greater detail.

As shown in FIG. 2, each microsystem 26 comprises a microsystem mobility control processor (MS MCP) 30 and at least one microsystem zone controller (MS ZC) 32 which are interconnected via a LAN (local area network) 34, and a plurality of microsystem base stations 36 each in a respective microcell 38 of the microsystem, connected to an MS ZC, and having a respective antenna arrangement 40. The MS MCP 30 is for example connected via a serial data link 42 to the MTX 14 shown in FIG. 1, or to a PABX (private automatic branch exchange, not shown). Each base station 36 comprises one or more TRs 18 (not shown in FIG. 2) as already described above. The microcells 38 collectively constitute the geographical area 28 of the microsystem 26.

The MS MCP 30 and MS ZC 32 together provide functions such as OA&M (operations, administration, and maintenance), management of the LAN 34, mobility management functions for communications with mobile terminals in the microsystem, and call management functions including hand off of mobile terminals between the TRs 18 of the MS base stations 36, and frequency channel selection in accordance with the invention as described below.

As explained in the background of the invention, the microsystem 26 reuses frequency channels which are allocated to the macrosystem but which are not being used locally by the macrosystem. For example, within the geographic area 28 of the microsystem 26 in the macrosystem cell 12, many of the frequency channels which are in use by the macrosystem in the adjacent macrosystem cells 12a may have sufficiently small signal strengths that they can be used by the microsystem, at relatively low but sufficient signal strengths within the area 12, without interference between the macrosystem and the microsystem. Determining which frequency channels may be used in this manner requires not only an initial determination of the signal strengths on the frequency channels, but also a continuing monitoring of the signal strengths in view of possibly rapid changes of signal conditions and frequency use by the macrosystem over time.

This continuing monitoring must also take into account actual reuse of frequency channels by the microsystem 26 itself, as well as the possibility of reuse of the same frequency channels by other microsystems within the macrosystem, for example in adjacent buildings within the same macrosystem cell 12. The consequent adoption of frequency channels by the microsystem must have a rapid response to possible changing conditions, and an efficient reuse of the frequency channels in order to enhance the total capacity of multiple microsystems within the macrosystem serving area.

These functions are carried out in the zone controller 32, possibly in conjunction with other associated computing resources (not shown) connected to the LAN 34, using procedures and frequency channel lists which are described below with reference to FIG. 3.

Figure 3:
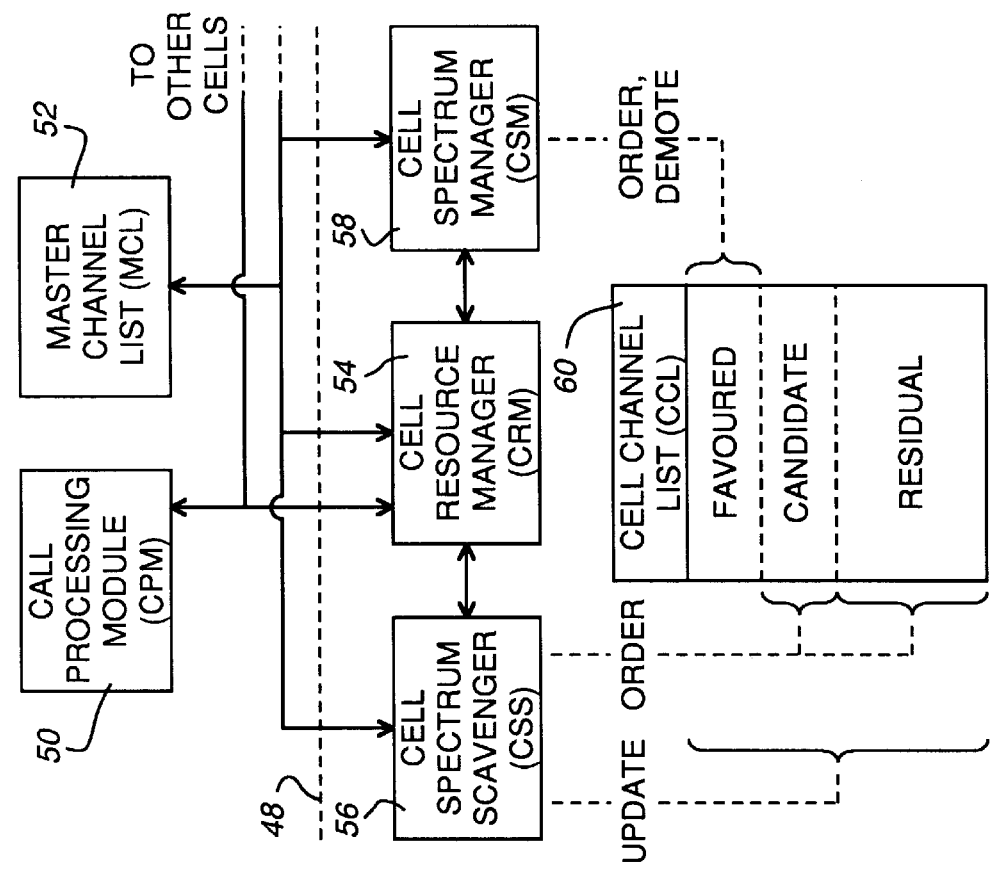
FIG. 3 illustrates procedures and lists used in carrying out an embodiment of the invention.

FIG. 3 illustrates, above a broken line 48, elements which are common to all cells of the microsystem 26, these elements including a call processing module (CPM) 50 and a master channel list (MCL) 52. FIG. 3 also illustrates, below the line 48, elements which are provided individually and separately for each microcell 38 of the microsystem. Only the elements for one microcell 38 are shown in FIG. 3, these elements being duplicated for each other microcell 38. These elements comprise, for each microcell 38, a cell resource manager (CRM) 54, a cell spectrum scavenger (CSS) 56, a cell spectrum manager (CSM) 58, and a cell channel list (CCL) 60. The CRM 54, CSS 56, and CSM 58 are procedures which run on one or more processors of the zone controller 32 or associated computing resources to create and maintain the CCL 60 in the manner described in detail below. To this end, these procedures communicate with one another and with the MCL 52, and the CRM 54 communicates with the CPM 50, as shown by arrowed lines between these elements. Again it is emphasized that, although these procedures are provided for each microcell 38 and may all run on a single processor, the procedures for each microcell are individual and separate from the procedures for each other microcell.

The CPM 50 operates in known manner to handle calls in the microsystem 26, and is not further described except for its interaction with the CRM 54. The MCL 52 is updated as described below to maintain a list of all of the frequency channels which are currently being used by the microsystem 26 in any of the microcells 38.

Figure 4:
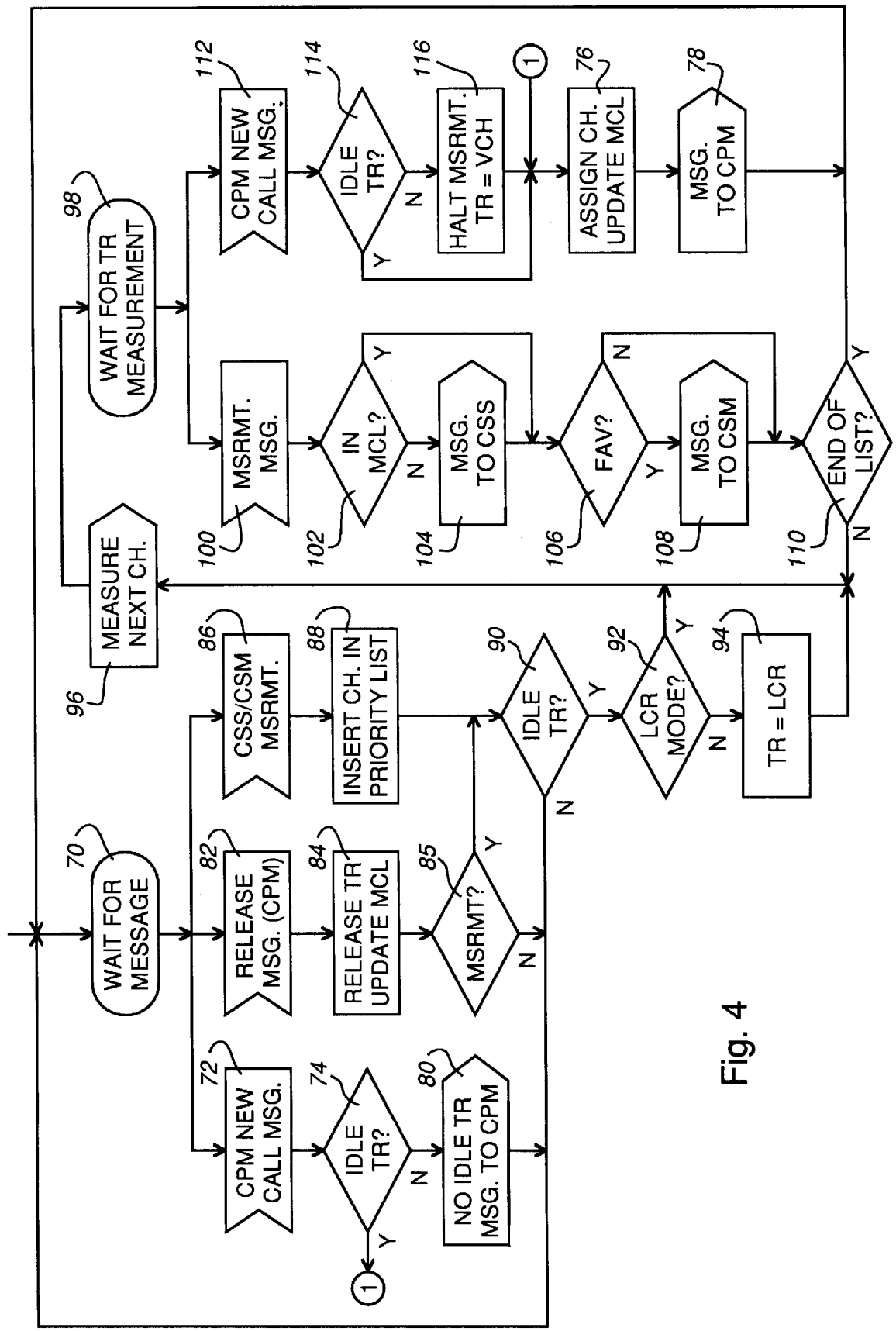
FIGS. 4, 5, and 6 are simplified flow charts respectively illustrating cell resource manager (CRM), cell spectrum scavenger (CSS), and cell spectrum manager (CSM) procedures for a microcell of the microsystem.

The CRM 54 serves to manage the resources, especially the operation of and the frequencies assigned to the TRs 18, of the respective microcell 38 for which the CRM 54 is provided. FIG. 4, described in detail below, is a flow chart illustrating the operation of the CRM 54.

Figure 5:
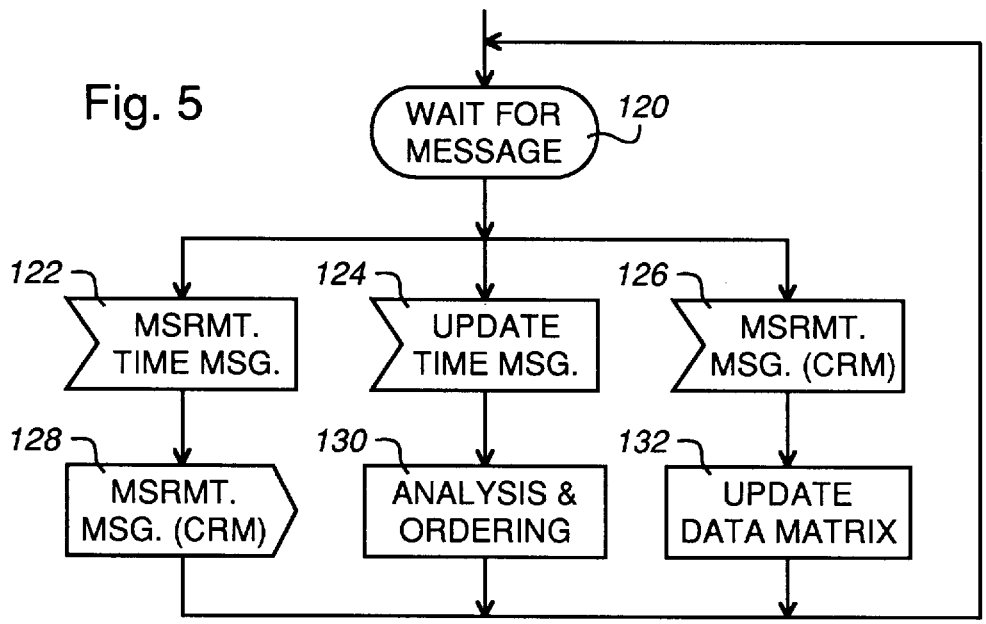

The CSS 56 collects long-term measurements of the signals in the respective microcell 38 for all of the frequency channels which the microsystem 26 may use, and performs statistical analysis on these measurements to create and update the CCL 60. The CCL 60 contains a list of all of these frequency channels, grouped into three categories or sets which as shown in FIG. 3 are referred to as the favoured set, the candidate set, and the residual set of channels. These are further explained below. The CSS also serves for ordering the listings of the sets of candidate and residual channels in the CCL 60. FIG. 5, described in detail below, is a flow chart illustrating the operation of the CSS 56.

Figure 6:
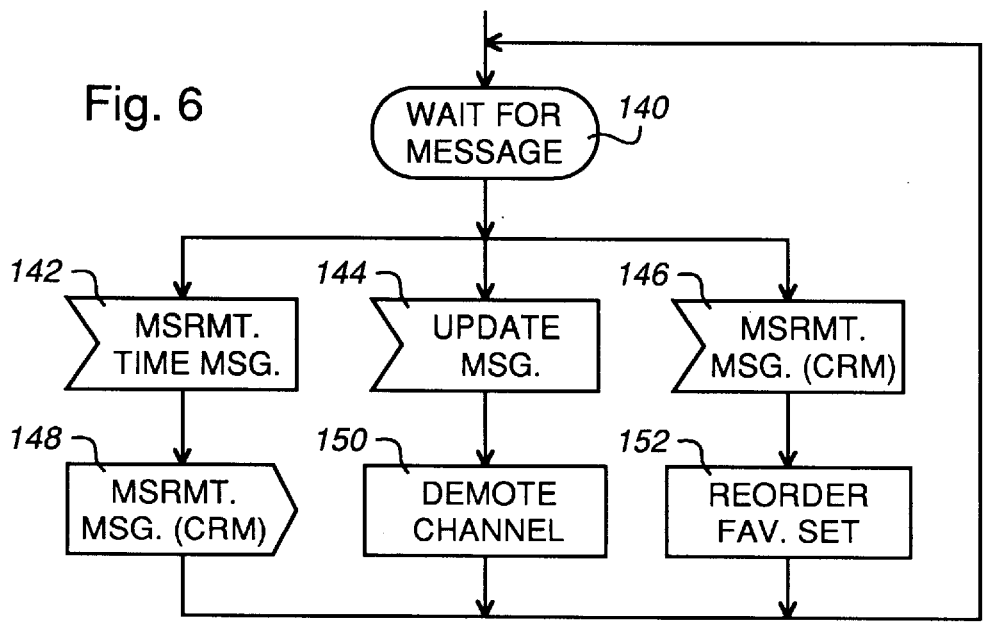

The CSM 58 collects short-term or frequent measurements of the signals in the respective microcell 38 for the frequency channels which are in the favoured set in the CCL 60, and maintains a desired order of the set of favoured channels for use in the respective microcell 38 to promote efficient reuse of the frequency channels by the microsystem. The CSM 58 also serves for demoting channels from the favoured set to the candidate or residual sets in the event that the channels become undesirable for use in the respective microcell 38. FIG. 6, described in detail below, is a flow chart illustrating the operation of the CSM 58.

Before describing the CRM, CSS, and CSM procedures in detail, it is useful to provide an overview of the functions and purposes of these procedures. The basic aim is to include in the favoured set of channels in the CCL 60 those channels which are to be used in the respective microcell 38, and to identify their preferred order of use at any time. The channels which are in the favoured set may change over time, for example with changing use of frequency channels in the macrosystem, deployment of other microsystems, and changing signal conditions; generally (in a macrosystem in which the channel assignments to the cells 12, 12a are fixed rather than dynamic) these changes are slow. These changes are measured over the long term by the CSS 56, the measurements for each channel only being performed when the channel is not being used anywhere in the microsystem (because such use would change the measurement).

The preferred order for use of the channels in the favoured set can change rapidly, for example with use of these same channels in other microcells of the microsystem (a channel may be included in the favoured sets of CCLs 60 for different microcells 38 in the microsystem and may be preferred for use in several microcells; as soon as it is used by one of the microcells, it ceases to be preferred for the other microcells) or with use of the channels in other nearby microsystems. The CSM 58 therefore frequently determines the current preferred order of channels in the favoured set.

At the same time, the CRM 54 manages the cell resources which are needed, not only by the CSS 56 and the CSM 58 to collect information for maintaining the CCL 60, but also for processing of calls to and from the MTs 22 as determined by the CPM 50.

The sets of channels in the CCL 60 can be determined in different ways, but conveniently the long-term statistics from measurement of all of the channels as described below are used to order all of the channels in the CCL 60. The favoured and candidate sets can then be constituted respectively by the best and next-best channels which are usable within the respective microcell, in each case up to a predetermined maximum number of for example 32 channels in each of these sets. The other channels constitute the residual set of channels. Although some of the residual channels could conceivably also be usable in the respective microcell, they are excluded from the candidate set by the predetermined maximum number of channels in this set in order to reduce the channel measurement resources required, measurements on the channels in the residual set being performed much less frequently than measurements on the channels in the candidate set, as further described below. The predetermined maximum number of channels in each of the favoured and candidate sets is conveniently selected to be about twice the number of TRs 18 in the microcell, for example 32 as indicated above for 16 TRs 18 in the microcell.

In the following detailed description of the CRM 54, CSS 56, and CSM 58 procedures, the reference numbers of blocks in FIGS. 4, 5, and 6 are given in parentheses to facilitate reference to these figures without detracting from the flow of the description.

Referring to FIG. 4, the CRM 54 initially waits (70) for a message from the CPM 50, the CSS 56, or the CSM 58. When a new call arrives, if there is a time slot free on an active channel in the microcell the CPM 50 assigns the call to this time slot; otherwise it sends a new call message (72) to the CRM 54, which in response determines (74) whether or not there is an idle TR 18 available in the microcell. If there is, then the CRM assigns (76, via connection point 1) the current most preferred channel from the top of the favoured set in the CCL 60 to this TR 18, and updates the MCL 52 accordingly; in other words, the CRM 54 adds this channel to the MCL 52 to indicate that this channel is now in use in the microsystem 26. The CRM then sends (78) a message to the CPM 50 to inform it of the identities of the assigned TR 18 and frequency channel, and returns to its wait state (70). If no TR 18 is idle (74), then the CRM sends (80) a message to this effect to the CPM 50 and returns to its wait state (70). The new call is in this case blocked by the CPM 50.

In response to termination of a call which results in a TR 18 becoming inactive, the CPM 50 sends a release message (82) to the CRM 54, which releases (84) the TR 18 and updates the MCL 52 accordingly, i.e. it removes the frequency channel which had been assigned to this TR from the list of channels in use anywhere in the microsystem. The CRM 54 then determines (85) whether a measurement as discussed below is to be made, i.e. whether or not a priority list also discussed below is empty. If no measurement is to be made, i.e. the priority list is empty, the CRM 54 returns to its wait state (70). If a measurement is to be made, i.e. one or more channels are identified in the priority list but measurements have been prevented because there was no TR 18 available to make the measurements, then the newly inactive TR 18 can potentially be used for this purpose, and accordingly a branch is made to the block 90 described below.

The CRM 54 also receives measurement requests (86) from the CSS 56 and the CSM 58, these requests identifying the frequency channels on which measurements are to be made. In response to measurement requests the CRM inserts (88) identities (i.e. channel numbers) of the channels to be measured in a priority list of channels to be measured. The highest priority is given to requests from the CSM 58 for measurements of frequency channels in the favoured set of the CCL 60. For example, with up to 32 channels in the favoured set as indicated above, a measurement may be requested by the CSM 58 for each channel in the favoured set every 10 seconds. The numbers of these channels are inserted at the start of the priority list. The CSS 56 may request less frequent measurements of the channels in the candidate set, for example with up to 32 channels in the candidate set as indicated above, a measurement may be requested by the CSS 56 for each channel every 16 seconds, the numbers of these channels being inserted next on the priority list. The CSS 56 may also request a measurement of each channel in the residual set at longer intervals, for example every 300 seconds, the numbers of these channels being inserted at the end of the priority list.

The CRM 54 determines (90) whether or not there is an idle TR 18 available in the respective microcell; if not, then no measurement can be performed at this time and it returns to its wait state (70). If there is an idle TR 18 available in the microcell, the CRM determines (92) whether this is in its locate receiver (LCR) mode for measuring received signal strength (RSS), and if not it switches (94) the TR 18 to the LCR mode. The CRM then instructs (96) this TR to tune to the next channel in the priority list and to measure the RSS of that channel in the microcell, and waits (98) for the resulting measurement.

On receipt (100) of a measurement message from the TR 18 in the LCR mode, the CRM 54 determines (102) whether or not the frequency channel to which the measurement relates is in the MCL 52 and hence whether or not this channel is in current use by the microsystem. If the channel is not in the MCL 52, then the measurement is a valid measurement of the signal conditions for the channel arising from external influences, for example use of the channel by the macrosystem or other microsystems, and noise or interference on the channel. In this case the CRM 54 sends (104) a message containing the measurement and channel number to the CSS 56 for incorporation into its long-term statistics as described below. If the channel is in the MCL 52, i.e. if it is in current use somewhere in the microsystem 26, then no measurement message is sent to the CSS 56. In this manner, the CSS 56 for the respective microcell is supplied with measurements of the channels which are not in the favoured set for any of the microcells of the microsystem and hence are not in use by the microsystem, and channels which are in the favoured set for one or more of the microcells but which are not being used anywhere in the microsystem at the time of the measurement. Over time, this provides to each CSS 56 data for all of the channels.

The CRM 54 also determines (106) whether or not the channel to which the measurement relates is in the favoured set in the CCL 60 for its own microcell, and if so sends (108) a measurement message to the CSM 58 for this microcell. The CSM 58 is thus supplied frequently (because of the frequency and priority of its measurement requests) with measurements for all of the channels in the favoured set for its microcell. The CRM 54 then determines (110) whether the end of the priority list has been reached. If so, a return is made to the wait state (70), and if not, a measurement of the next channel in the priority list is instructed (96) as described above.

In the event that a new call to be handled by the microcell is received by the CPM 50 while the CRM 54 is waiting (98) for a measurement by a TR 18 in the LCR mode, and there is no free time slot on an active channel to accommodate this call, then the CPM 50 sends a new call message (112) to the CRM 54. The CRM 54 determines (114) whether or not there is an idle TR 18 in the microcell, and if so assigns (76) the most preferred channel to this TR, updates the MCL 52, and sends a message to the CPM 50, as already described above. A return (not shown in FIG. 4) is then made to the wait for measurement state (98). If the CRM 54 determines (114) that no TR 18 in the microcell is idle, it aborts the measurement process and gives priority to the call. Consequently, the CRM 54 halts (116) the measurement and switches the TR 18 that was being used for the measurement from its LCR mode to its voice channel (VCH) mode, and then assigns (76) the most preferred channel to this TR, updates the MCL 52, sends a message to the CPM 50, and returns to the wait state (70).

Referring now to FIG. 5, the CSS 56 initially waits (120) for a message from timers (not shown) indicating a measurement time (122) or an update time (124), or a measurement message (126) from the CRM 54. As indicated above, a measurement time can occur for example every 16 seconds for each channel in the candidate set, and every 300 seconds for each channel in the residual set. In response to a measurement time message (122) which identifies each channel of the candidate or residual set in the CCL 60 which is to be measured, the CSS 56 sends (128) a measurement request to the CRM 54 (received at (86) in FIG. 4), which prioritizes and handles the measurement requests as described above. In response to an update time message (124), which may for example be produced hourly or less frequently, the CSS 56 performs a statistical analysis (130) and consequent ordering of the CCL 60 as described below. The update time message can alternatively be supplied to the CSS 56 in the event that, for example as a result of demotion, as described below, of channels from the favoured set into the residual set, an updating of the channels in the favoured and candidate sets is required. In response to a measurement message (126) from the CRM 54 (sent at (104) in FIG. 4), the CSS 56 updates (132) a data matrix for the measured channel as described below. After sending (128) a measurement request, performing the statistical analysis and ordering (130), or updating (132) the data matrix, the CSS 56 returns to the wait state (120).

Each measurement for each frequency channel determines the received signal strength or power of the channel at the measurement time. As can be seen from the above description, over a period of time the power levels of all of the frequency channels, regardless of their places in the CCL 60, will be measured in each microcell and will be supplied to the CSS 56. For each frequency channel, the CSS 56 determines from the measurements supplied to it the peak power measured in the microcell for that channel during a predetermined period, for example one hour, and stores this in the data matrix referred to above. The stored data thus include measurements for different hours or periods in each day, enabling channel measurements which may vary in a daily cycle to be accommodated. In successive predetermined periods, the CSS 56 accumulates in the data matrix a series of peak powers for each channel, the oldest data eventually being overwritten by newer data. The peak power of each channel is stored because it provides a good indication of the worst possible interference condition from outside the microsystem that would be experienced if the microsystem were to use the channel in the respective microcell (it being kept in mind that the CSS 56 is only supplied with measurements for channels when they are not in use by the microsystem). In addition to the peak power, the CSS 56 could store further information, such as the average and minimum powers for the channel in the microcell during the predetermined periods, for additional use in determining the order of channels in the CCL 60.

In the analysis and ordering step (130) of FIG. 5, the CSS 56 determines, for each frequency channel, from the data matrix a parameter which it uses for sorting the channels into the preferred order in the CCL 60. For example, this parameter can conveniently be a particular percentile value, for example the 95th percentile value, of the peak powers of the channel stored in the data matrix for the relevant hour or period of the day. The 95th percentile value is a value of peak power which is greater than 95%, and less than 5%, of the peak power values stored in the data matrix for the channel for the relevant hour or period of the day, and can be determined by the CSS 56 directly from the values stored in the data matrix. The lower this value, the better the frequency channel is for use by the microsystem in the respective microcell. Accordingly, the CSS 56 then sorts the channels in the CCL 60 in accordance with this parameter, with channels having the lowest value of this parameter at the top of the CCL 60 and hence forming the favoured set of channels. A value of this parameter greater than a predetermined threshold indicates that the channel is unusable in the microcell and forms part of the residual set of channels.

Alternatively, the sorting parameter for ordering the channels in the CCL 60 can be calculated in another manner. For example, it can be assumed that the peak power values for each channel have a Gumbel cumulative distribution function, for which the 95th percentile value can be calculated from the sum and sum-of-squares of the peak power values; accordingly, only these need to be stored for each channel, thereby reducing the data storage requirements of the data matrix.

The end result of the operations of the CSS 56 procedure as described above is that the CCL 60 for the respective microcell is maintained to list the channels in an order based on long-term statistics, with the most preferred or best channels being included in the favoured set of channels. It is noted here that one of the best channels in each CCL 60 is used to provide the necessary control channel for communications in the respective microcell, the selection of control channel frequencies being centrally determined by the zone controller 32 so that different microcells use separate control channels to avoid interference with one another. The control channels are segregated from the rest of the channels and are not used for calls.

Referring now to FIG. 6, the CSM 58 initially waits (140) for a message from a timer (not shown) indicating a measurement time (142) for measuring a channel of the favoured set, or an update message (144), or a measurement message (146) from the CRM 54. As indicated above, a measurement time can occur for example every 10 seconds for each channel in the favoured set. In response to a measurement time message (142) which identifies each channel of the favoured set in the CCL 60 which is to be measured, the CSM 58 sends (148) a measurement request to the CRM 54 (received at (86) in FIG. 4), which gives the request priority and handles it as described above. An update message (144) can for example be supplied by the CRM 54 in order to identify a frequency channel which, although it has been included in the set of favoured channels, is identified as having had a poor call quality history, for example having a low CIR (carrier-to-interference ratio). In response to the update message, the CSM 58 can demote (150) the identified channel from the favoured set to the candidate set or the residual set of channels, and replace it with the best of the channels in the candidate set. Thus the CSM 58 partially re-orders the CCL 60 by moving the demoted channel to a lower position in the list and moving intermediate channels up in the list. In response to a measurement message (146) from the CRM 54 (sent at (108) in FIG. 4), the CSM 58 reorders (152) the channels in the favoured set to keep them in a preferred order for use. After sending (148) a measurement request, demoting a channel (150), or reordering (152) the favoured set of channels, the CSM 58 returns to the wait state (140).

The reordering (152) of the channels in the favoured set serves, as already indicated above, to determine a short-term order for use of the channels in the respective microcell. This order can change rapidly. For example, one frequency channel may be at the top of the favoured set of channels for two different microcells. If this channel is assigned for handling a new call in a first one of these microcells, then its measured signal strength (RSS) in the other (second) microcell suddenly increases and, although it remains a channel in the favoured set of channels for the second microcell, it becomes unusable in the second microcell for the duration of its assignment in the first microcell. The CSM 58 for the second microcell must therefore rapidly change its order for use of the channels in its favoured set so that this channel is no longer preferred. Conversely, at the end of the assignment of the channel in the first microcell, the RSS of the channel in the second microcell suddenly decreases and the channel can again become preferred for the second microcell.

Figure 7:
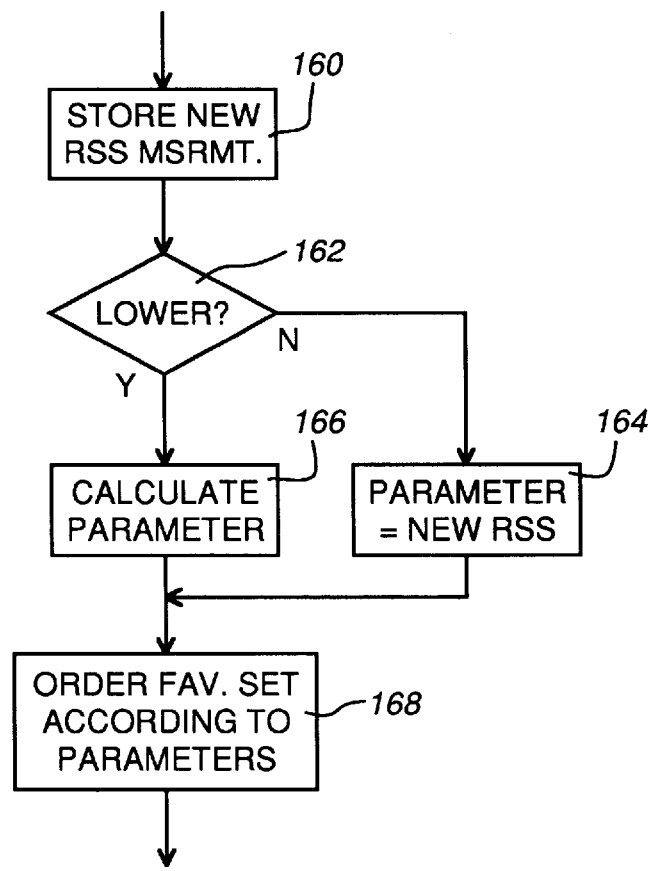
FIG. 7 is a flow chart illustrating steps of a procedure used for ordering selected macrosystem channels for re-use in a microcell of the microsystem.

Accordingly, the reordering (152) of the channels in the favoured set by the CSM 58 following a measurement message from the CRM 54 is effected in accordance with a parameter which is at least primarily based on the current RSS measurement of the channel, the most preferred channel having the smallest value of this parameter. In a preferred arrangement, as illustrated in FIG. 7, for each channel in the favoured set this parameter is equal to the most recent RSS measurement for the channel if this is greater than or equal to the preceding measurement for the channel. This ensures that, in the circumstance described above of a channel becoming used in another microcell, the parameter for this channel is rapidly increased so that this channel is not preferred. When the most recent RSS measurement for the channel is less than the preceding measurement, a rapid change in the parameter is less desirable. In this case, it is convenient for the parameter for the channel to be determined as equal to the sum of a mean value of RSS for the channel and P times the standard deviation of RSS measurements for the channel, where P is a predetermined integer. To this end, the CSM 58 can store for each channel in the favoured set a sum and a sum-of-squares of the RSS measurements for the channel accumulated over a period, such as 50 seconds, determined in relation to the average length of calls handled by the microsystem.

Referring to FIG. 7, each new RSS measurement for a channel in the favoured set is stored (block 160). The CSM 58 determines at a block 162 whether the new RSS measurement is lower than the previously stored measurement for the same channel. If not, i.e. if the RSS is constant or increasing, then the CSM 58 sets an ordering parameter as being equal to the new RSS measurement at a block 164, whereby the parameter is increased in proportion to the RSS when this increases. If the new measurement is lower than the previous measurement as determined at the block 162, i.e. if the RSS is decreasing, then at a block 166 the CSM 58 calculates as described above a new value of the parameter so that this is decreased more slowly than decreases in the measured RSS. The CSM 58 then re-orders the channels in the favoured set in accordance with their parameters at a block 168.

The reordering (152) of the channels in the favoured set can be arranged also to be influenced by other factors, such as the call quality history for the channel and/or a desire to minimize the total number of frequencies used by the microsystem. In the latter respect, for example, the most recent RSS measurement for each channel in the favoured set can be compared with a threshold value to determine whether or not the channel is currently usable in the respective microcell, and the usable channels can be ordered in accordance with the extent to which they are already in use in other microcells of the microsystem, preference for reuse being given to those frequencies which are already the most used.

Although as described above the use of channels by the microsystem 26 is determined only by RSS measurements for channels in the so-called uplink direction, this being effected using the existing capacity of the TRs 18 in the LCR mode, the invention is not limited in this respect. For example, if the TRs 18 are capable of performing other measurements, such as CIR or BER (bit error rate), then these measurements may be used instead of or as well as the RSS measurements to determine the preferred order of the channels in the CCL 60 for each microcell. In addition, if at least one terminal (preferably a test terminal having a fixed geographical position, for consistent and reliable measurements) in each microcell is also capable, in accordance with known MAHO (mobile assisted hand off) and MACA (mobile assisted channel allocation) proposals, to carry out RSS and/or other measurements on the so-called downlink direction from the base stations 36 to the mobile terminals 22, or if a TR 18 is tunable to the downlink frequency channels to perform such measurements, then these downlink measurements can be used instead of or as well as the uplink measurements in the determination of channels for use in each microcell. The particular manner in which the uplink and/or downlink measurements are used can depend on the reliability of the measurements and the complexity of using them. As only one example which can be easily implemented, the ordering of channels in the CCL 60 for each microcell can be based on uplink measurements as already described above, except that any channel whose downlink characteristics do not satisfy a predetermined threshold can be excluded from the favoured and candidate sets in the CCL 60.

Thus although a particular embodiment of the invention has been described in detail above, it should be appreciated that numerous modifications, variations, and adaptations may be made without departing from the scope of the invention as defined in the claims.

What is claimed is:

1. A method of selecting radio frequency channels, assigned for use in cells of a cellular radio communications system (macrosystem), for use in microcells of a microcellular radio communications system (microsystem) in the vicinity of the macrosystem, comprising the steps of:

identifying in the microsystem during operation of the microsystem each frequency channel which is in current use in any microcell of the microsystem; and for each microcell of the microsystem, measuring a signal characteristic for the microcell of each frequency channel when the channel is not identified as being in current use in any microcell of the microsystem;

determining a statistical preference for use of the frequency channels in the microcell in dependence upon repeated measurements of the signal characteristic; and selecting frequency channels for use in the microcell in accordance with the statistical preference.

2. A method as claimed in claim 1 wherein the step of identifying each frequency channel which is in current use comprises maintaining a list of frequency channels in use in any microcell of the microsystem.

3. A method as claimed in claim 1 wherein, for each microcell of the microsystem, the steps of determining a statistical preference and selecting frequency channels for use in the microcell comprise identifying a favoured set of frequency channels, having a most preferred signal characteristic, and using only frequency channels in the favoured set in the microcell of the microsystem.

4. A method as claimed in claim 3 wherein the favoured set comprises a predetermined number of frequency channels.

5. A method as claimed in claim 4 wherein, for each microcell of the microsystem, the measurement of the signal characteristic for each frequency channel in the favoured set is effected more frequently than the measurement of the signal characteristic for each frequency channel which is not in the favoured set.

6. A method as claimed in claim 3 wherein, for each microcell of the microsystem, the measurement of the signal characteristic for each frequency channel in the favoured set is effected more frequently than the measurement of the signal characteristic for each frequency channel which is not in the favoured set.

7. A method as claimed in claim 6 wherein the measured signal characteristic of each frequency channel comprises a received signal strength of the frequency channel, channels having lower received signal strength measurements in each microcell being more preferred for use in the microcell.

8. A method as claimed in claim 3 and further comprising, for each microcell of the microsystem, the steps of:

measuring the signal characteristic for the microcell of each frequency channel in the favoured set regardless of whether or not the channel is identified as being in current use in any microcell of the microsystem; and determining an order for use of the frequency channels in the favoured set in dependence upon recent measurements of the signal characteristic;

wherein the step of selecting frequency channels for use in the microcell comprises selecting frequency channels for use in the microcell in accordance with the determined order.

9. A method as claimed in claim 8 wherein, for each microcell of the microsystem, the measurement of the signal characteristic for each frequency channel in the favoured set is effected more frequently than the measurement of the signal characteristic for each frequency channel which is not in the favoured set.

10. A method as claimed in claim 9 wherein the measured signal characteristic of each frequency channel comprises a received signal strength of the frequency channel, channels having lower received signal strength measurements in each microcell being more preferred for use in the microcell.

11. A method as claimed in claim 8 wherein the measured signal characteristic of each frequency channel comprises a received signal strength of the frequency channel, channels having lower received signal strength measurements in each microcell being more preferred for use in the microcell.

12. A method as claimed in claim 1 wherein the measured signal characteristic of each frequency channel comprises a received signal strength of the frequency channel, channels having lower received signal strength measurements in each microcell being more preferred for use in the microcell.

13. A method of selecting radio frequency channels, for use in a plurality of microcells of a microcellular radio communications system, from a set of frequency channels, comprising the steps of, for each microcell;
  performing signal measurements for frequency channels in the set;
  determining a favoured set of frequency channels for use in the microcell in dependence upon signal measurements performed during operation of the microsystem for each frequency channel only when the frequency channel is not in use in any microcell of the microsystem; and
  selecting a frequency channel for use in the microcell from the favoured set of frequency channels in dependence upon signal measurements performed during operation of the microsystem regardless of whether or not the frequency channel is in current use in any microcell of the microsystem.

14. A method as claimed in claim 13 wherein, for each microcell, the signal measurements are performed more frequently for frequency channels in the favoured set than for frequency channels which are not in the favoured set.

15. A method of selecting radio frequency channels, assigned for use in cells of a cellular radio communications system (macrosystem), for use in microcells of a microcellular radio communications system (microsystem) in the vicinity of the macrosystem, comprising the steps of:
  identifying in the microsystem during operation of the microsystem each frequency channel which is in current use in any microcell of the microsystem; and
  for each microcell of the microsystem,
    measuring a signal characteristic for the microcell of each frequency channel when the channel is not identified as being in current use in any microcell of the microsystem;
    identifying a favoured set of frequency channels, having a most preferred signal characteristic, and using only frequency channels in the favoured set in the microcell of the microsystem;
    measuring the signal characteristic for the microcell of each frequency channel in the favoured set regardless of whether or not the frequency channel is identified as being in current use in any microcell of the microsystem, the measured signal characteristic of each frequency channel in the favoured set comprising a received signal strength of the frequency channel;
    determining an order for use of the frequency channels in the favoured set in accordance with a parameter which is increased in proportion to increases in, and decreased more slowly than decreases in, the received signal strength measurements of each frequency channel in the favoured set, the lower values of the parameter being preferred; and
    selecting frequency channels for use in the microcell in accordance with the determined order.

16. A method as claimed in claim 15 wherein, for each microcell of the microsystem, the measurement of the signal characteristic for each frequency channel in the favoured set is effected more frequently than the measurement of the signal characteristic for each frequency channel which is not in the favoured set.

17. A method of selecting radio frequency channels, for use in a plurality of microcells of a micro-cellular radio communications system, from a set of frequency channels, comprising the steps of, for each microcell:
  performing signal measurements for frequency channels in the set;
  determining a favoured set of frequency channels for use in the microcell in dependence upon signal measurements performed during operation of the microsystem for each frequency channel when the frequency channel is not in use in any microcell of the microsystems; and
  selecting a frequency channel for use in the microcell from the favoured set of frequency channels in dependence upon signal measurements performed during operation of the microsystem regardless of whether or not the frequency channel is in current use in any microcell of the microsystem, the selected frequency channel having a lowest value of a parameter which is increased in proportion to increases in, and decreased more slowly than decreases in, a received signal strength measurement of the frequency channel.

18. A method as claim 17 wherein, for each microcell, the signal measurements are performed more frequently for frequency channels in the favoured set than for frequency channels which are not in the favoured set.

19. In a micro-cellular radio communications system (microsystem) which re-uses radio frequency channels assigned for use in cells of a cellular radio communications system (macrosystem) in the same vicinity as the microsystem, and in which a plurality of frequency channels are selected for potential use in each microcell of the microsystem, a method of assigning the selected frequency channels for use in each microcell, comprising the steps of:
  repeatedly measuring in the microcell during operation of the microsystem a received signal strength of each selected frequency channel regardless of whether or not the channel is in current use in the microsystem:
  determining a preference for use of the selected frequency channels in accordance with a parameter which is increased in proportion to increases in, and decreased more slowly than decreases in, the received signal strength measurement of each selected frequency channel, lower values of the parameter being preferred for use in the microcell; and
  assigning the selected frequency channels for use in the microcell in accordance with the determined preference.

* * * * *